(12) United States Patent
Deylitz et al.

(10) Patent No.: US 7,869,194 B2
(45) Date of Patent: Jan. 11, 2011

(54) CLOSING APPARATUS FOR A WITHDRAWABLE-PART RACK

(75) Inventors: Erhard Deylitz, Berlin (DE); Pierre Lamoth, Berlin (DE)

(73) Assignee: Siemens Aktiengesellscahft, Munich (DE)

( * ) Notice: Subject to any disclaimer, the term of this patent is extended or adjusted under 35 U.S.C. 154(b) by 232 days.

(21) Appl. No.: 12/292,243

(22) Filed: Nov. 14, 2008

(65) Prior Publication Data
US 2009/0128999 A1    May 21, 2009

(30) Foreign Application Priority Data
Nov. 15, 2007    (DE) .................. 10 2007 055 047

(51) Int. Cl.
H02B 1/04    (2006.01)
H02B 1/20    (2006.01)
H02B 1/26    (2006.01)
(52) U.S. Cl. ............... 361/647; 361/634; 361/638; 361/652; 361/653; 361/657; 200/50.21; 200/50.22
(58) Field of Classification Search ............ None
See application file for complete search history.

(56) References Cited

U.S. PATENT DOCUMENTS

| | | | |
|---|---|---|---|
| 4,565,908 A * | 1/1986 | Bould | 200/50.22 |
| 4,773,870 A | 9/1988 | Sinnig | |
| 5,343,355 A | 8/1994 | Ishikawa | |
| 5,486,978 A * | 1/1996 | Fishovitz | 361/617 |
| 5,550,707 A * | 8/1996 | Iversen | 361/617 |
| 5,761,025 A * | 6/1998 | Iversen | 361/617 |
| 6,031,191 A * | 2/2000 | Ahlert et al. | 200/50.21 |
| 6,414,839 B1 * | 7/2002 | Derksen | 361/617 |
| 7,348,505 B2 * | 3/2008 | Kashyap et al. | 200/50.22 |
| 7,440,259 B1 * | 10/2008 | Deylitz et al. | 361/617 |

FOREIGN PATENT DOCUMENTS

| | | |
|---|---|---|
| DE | 3544667 A1 | 6/1987 |
| DE | 69304818 T2 | 1/1997 |
| DE | 10120750 C1 | 7/2002 |
| DE | 10342596 B3 | 5/2005 |

* cited by examiner

Primary Examiner—Boris L Chervinsky
(74) Attorney, Agent, or Firm—Harness, Dickey & Pierce, PLC

(57) ABSTRACT

At least one embodiment of the invention provides that, for a closing apparatus for a part rack withdrawable via V-shaped rod assemblies, the closing apparatus includes at least one pin formed on rod assemblies or as part of them, each pin engaging in a slot in an actuating element. Owing to the use of the slots, the actuating element can be formed as a rigid body, with the result that no frictional forces need to be overcome when inserting a circuit breaker into a withdrawable-part rack with the closing apparatus according to at least one embodiment of the invention. With the closing apparatus according to at least one embodiment of the invention, a locking element can have a particularly simple design: it can be guided in the actuating element.

16 Claims, 5 Drawing Sheets

CLOSING APPARATUS FOR A WITHDRAWABLE-PART RACK

PRIORITY STATEMENT

The present application hereby claims priority under 35 U.S.C. §119 on German patent application number DE 10 2007 055 047.4 filed Nov. 15, 2007, the entire contents of which is hereby incorporated herein by reference.

FIELD

Embodiments of the invention generally relate to a closing apparatus for a withdrawable-part rack, into which a circuit breaker can be inserted.

BACKGROUND

A closing apparatus is known from DE 103 42 596 B3.

A closing apparatus for a withdrawable-part rack, which is also known under the name shutter, serves the purpose of preventing contacts (which are in the form of contact blades, for example) on the rear wall of the withdrawable-part rack being unintentionally touched by persons located on site when the withdrawable-part rack is open, i.e. when no circuit breaker has been inserted, and to prevent these people then from receiving an electric shock, which may be fatal. For this purpose, at least two plates with openings are provided (in the case of DE 103 42 596 B3 three plates), in a closed state of the closing apparatus the openings of each plate being covered by in each case another plate and in an opened state of the closing apparatus openings of all of the plates lying over one another.

In the closed state the plates therefore effectively cover the contacts (contact blades). In the open state, the entire plate arrangement can be moved over the contact blades, naturally with the proviso that the openings lie over one another with a precise fit. In order to lie the openings of the plates over one another, at least one plate needs to be displaceable (with respect to the other plates), for which purpose a special mechanism is provided which can be actuated by an inserted circuit breaker. The reason for this is that, during insertion of a circuit breaker, there is no longer any risk for operating personnel, in fact the risk would be even greater if the operating personnel would have to actuate the mechanism themselves.

The mechanism in DE 103 42 596 B3 is such that two V-shaped rod assemblies are provided, of which in each case the two limbs are connected to one another via an articulated joint (which can also be expressed as the two limbs being mounted in the articulated joint so as to be capable of a rotary movement). The articulated joint makes it possible for the rod assembly to spread apart (enlargement of the angle of the limbs with respect to one another). The free end of one of the limbs is connected to a plate to be displaced in each rod assembly. In principle it is possible for the free end of the other limb as well to be connected to another plate to be displaced, but in DE 103 42 596 B3 in each case one of the two limbs of the two V-shaped rod assemblies is fixed.

In the closing apparatus from DE 103 42 596 B3, a telescopic rod backs on the two articulated joints. The reason for the use of the telescopic rod is that a fixed connection between the articulated joints is not possible because the articulated joints move perpendicular to the insertion direction of the circuit breaker when the rod assembly is spread apart and in the process in particular the distance between them is enlarged. The telescopic rod now has a variable length.

It has proven to be disadvantageous that during the transition from the closed state to the open state the telescopic rod needs to be extended. In particular, the circuit breaker presses on the telescopic rod in the insertion direction, while the telescopic rod needs to perform its extension movement in the perpendicular direction thereto. This involves relatively high frictional forces, and the effect of these frictional forces is increased by virtue of the fact that considerable lever effects are achieved as a result of the presence of the V-shaped rod assembly.

SUMMARY

In at least one embodiment of the invention, a closing apparatus is disclosed to ensure operation with little friction.

In the closing apparatus according to at least one embodiment of the invention, in each case at least one pin is therefore formed on the rod assemblies or as part of the rod assemblies, and each such pin engages in an associated guide in an actuating element.

The guide makes it possible for the rod assembly to spread apart, during which process the articulated joints move perpendicular to the insertion direction of the circuit breaker without the actuating element itself needing to participate in this movement perpendicular to the insertion direction of the circuit breaker. The circuit breaker can therefore act on an actuating element which does not change its shape, with the result that high frictional forces are avoided. The actuating element can in particular be designed to be different than in DE 103 42 596 B3, as a rigid body.

A simple embodiment for providing the guides are slots, the actuating element preferably having at least one plate and particularly preferably two plates which run parallel to one another, are spaced apart from one another and in which the slots are formed.

Owing to the guides, preferably at least one state of the closing apparatus is defined. It is therefore preferably provided that each pin bears against a first stop at a first end of its associated guide in the closed state of the closing apparatus and/or against a second stop at a second end of its associated guide in the open state of the closing apparatus. In the embodiment with the slots, the ends of the slots are simply the stops. The second stop defines the open state when the rod assemblies are spread apart since it prevents them from spreading apart further. The first stop is expedient in particular in interaction with a spring, which couples the two rod assemblies to one another outside of the actuating element, since this spring draws the rod assemblies toward one another, and this movement toward one another is ended by the first stop.

In principle, the pins can be arranged at any desired points on the rod assembly, for example on one of the two limbs. It is an option, however, to provide the location closest to an inserted circuit breaker with a pin since particularly high lever effects can thus be achieved. This location is located on the articulated joint of the rod assemblies.

It has proven expedient to suppress an actuation of the actuating element starting from the closed state of the closing apparatus by way of a locking mechanism in order that operating personnel are impeded from producing the open state of the closing apparatus manually and thereby putting themselves at risk. The closing apparatus according to the invention has the advantage that such a locking mechanism can be formed particularly easily. Thus, it is possible for there to be arranged in and on the actuating element a locking element which is capable of moving relative to the actuating element in order to assume a locking state, in which it suppresses a movement of the pins in the respective guide. By way of blocking the pins, the entire closing apparatus can be blocked.

Thus, not only the actuating element has a simple design, but the locking element can likewise have a simple design. Two elements for actuating and locking the closing apparatus are sufficient, namely the actuating element and the locking element. In contrast, the number of component parts in the prior art is substantially higher.

It could now arise that an operator also brings the locking element out of the locking state if he wishes to produce the open state of the closing apparatus. In order to prevent this, a padlock can be used. The use of a padlock is possible when, in the locking state of the locking element, at least one hole in the locking element comes to be congruent with at least one hole in the actuating element, with the result that it is possible for a hoop of a padlock to be passed through. If the closing apparatus is then in the closed state and the closed state is intended to become permanent, the locking state is first produced and then a padlock is attached and closed, so that a user can no longer produce the open state of the closing apparatus without a key for the padlock.

The locking element should be prevented from falling out of the actuating element. An embodiment which has proven successful in practice is to produce the actuating element and the locking element separately and in the process to provide that the locking element undergoes a latching operation when it is inserted into the actuating element. As a result of this latching operation, it is then held in the actuating element, with the result that forces for unlatching need to be exerted in order to remove the locking element from the actuating element again. An embodiment which is particularly simple functions with latching tabs and grooves, the latching tabs preferably being formed on the locking element and the grooves in the actuating element. The grooves can then at the same time act as a guide during the movement of the locking element. This dual function can be made possible by virtue of the fact that they do not extend all the way through from one edge of the actuating element to the other edge. The latching tab therefore needs to be bent back in resilient fashion as long as it passes through the section in which the groove is not formed, until it can spring into the groove. The latching tabs and grooves can also ensure latching of the locking element in its locking state.

The operation of the locking element is intended to be particularly user-friendly. For this purpose, preferably at least one grip element is provided, which continuously protrudes out of the actuating element. By pulling the grip element, the locking element can then be brought into the locking state manually.

At least one embodiment of the invention is also based on a withdrawable-part rack with a closing apparatus according to at least one embodiment of the invention.

One aspect of at least one embodiment of the invention resides in the provision of a special actuating element. Preferably, an actuating element with a design according to at least one embodiment of the invention is used. This actuating element therefore has two parallel plates, in which in each case at least one slot for accommodating a pin is formed (preferably two slots, in each case for accommodating one of the two pins, namely one pin from each rod assembly). The two plates are spaced apart from one another, with the result that an interspace is formed between the two plates in which a locking element is capable of moving.

In at least one embodiment, one or more grooves are used for guiding and holding the movable locking element, which grooves are formed in at least one of the plates on the side thereof which faces the interspace, the groove not extending completely from one edge of the plate to the other edge of the plate.

A locking element can be used in the interspace in at least one embodiment. This locking element comprises a plate-shaped central part, on which in each case one hook for engaging around a pin is arranged laterally in order that the locking element can suppress the movement of the pins relative to one another. In order to guide the locking element in the actuating element according to the invention, at least one latching tab is formed at least on one surface of the plate-shaped central part.

It has been proven to be expedient to use two different types of closing apparatuses according to at least one embodiment of the invention which differ from one another in terms of the size of their component parts. The actuating element and the locking element can be used in the case of both types, however. This is particularly possible when the actuating element according to at least one embodiment of the invention for each type has in each case one slot or one pair of slots and the locking element according to at least one embodiment of the invention can be reconfigured. The locking element is capable of being reconfigured when it is in the form of two parts, each part having in each case at least one hook laterally. The locking element is then used in its two-part form in the larger embodiment of the closing apparatus. The two parts can be separated from one another, however, by the locking element being broken at a predetermined breaking point, and one of the parts can then be used as a locking element in the smaller type of closing apparatus.

BRIEF DESCRIPTION OF THE DRAWINGS

An example embodiment of the invention will be described below with reference to the drawings, in which.

DETAILED DESCRIPTION OF THE EXAMPLE EMBODIMENTS

Figure 1:
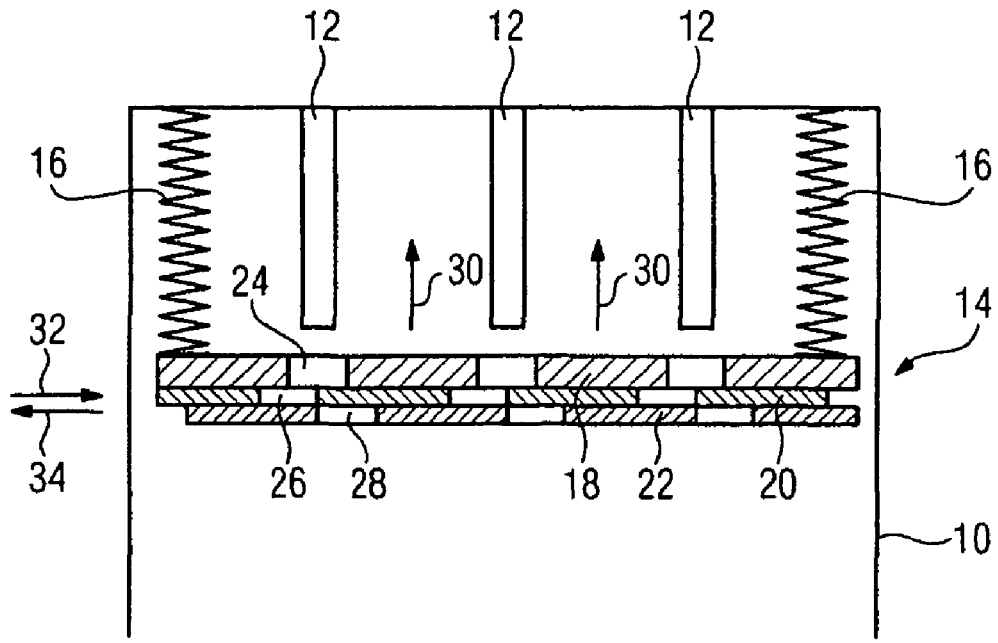
FIG. 1/FIG. 2 show, schematically, the way in which the plate arrangement which is used in the closing apparatus according to an embodiment of the invention and is known per se functions.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Figure 2:
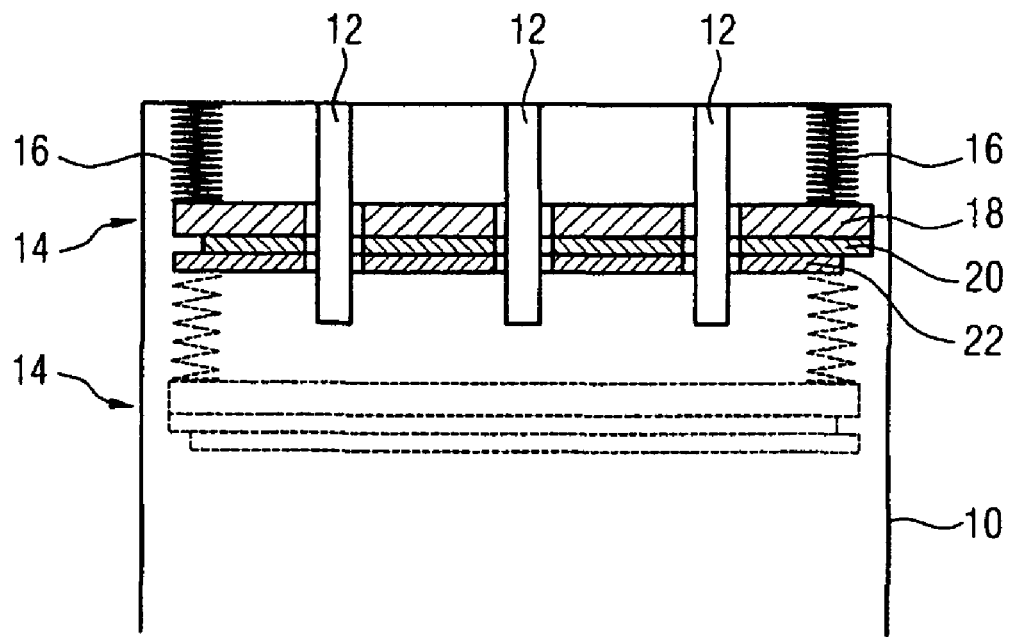

FIG. 1 and FIG. 2 show, schematically, a withdrawable-part rack, which is denoted as a whole by 10 and into which a circuit breaker can be inserted. The circuit breaker is intended to be provided with electrical energy via contact blades 12. The contact blades 12 are subject to high voltages and should not be accessible from the open end of the withdrawable-part rack if there is no circuit breaker in the withdrawable-part rack 10. For this reason, a plate arrangement 14 is provided which is supported on the withdrawable-part rack 10 by springs 16. The plate arrangement 14 in this case comprises precisely three plates, namely a first slightly more solid plate 18, which can also be referred to as the mask plate, and a first shutter plate 20 and a second shutter plate 22. All of the plates have openings, namely the mask plate 18 has openings 24, the first shutter plate 20 has openings 26 and the second shutter plate 22 has openings 28. In closed state of the plate arrangement and therefore of the closing apparatus shown in FIG. 1, the contact blades 12 are inaccessible since the openings 24, 26 and 28 are not aligned with one another. Instead, each of the openings 24, 26 and 28 is covered by in each case the body of one of the other plates. A relative movement of the plate arrangement 14 counter to the force of the springs 16, as is indicated by the arrows 30, is impossible. This is because the contact blades 12 cannot pass through the plate arrangement 14 in the closed state.

The first and second shutter plates 20 and 22 are now capable of moving relative to the mask plate 18, as is indicated by the arrows 32 and 34 in FIG. 1. The first shutter plate 20 is capable of being displaced toward the right corresponding to the arrow 32 in FIG. 1 and the second shutter plate 22 is capable of being displaced toward the left corresponding to the arrow 34. In an end position, the openings 24, 26 and 28 of the three plates 18, 20 and 22 lie precisely over one another, with the result that the contact blades 12 can pass through the plate arrangement 14. Thus, the state shown in FIG. 2 can be reached, in particular a circuit breaker, when it is inserted, pressing the plate arrangement 14 toward the rear in such a way that the contact blades 12 are accessible for the circuit breaker on the insertion side facing the circuit breaker in order that the circuit breaker can make contact with the contact blades and can receive electrical energy via said contact blades.

FIG. 1 and FIG. 2 do not illustrate the mechanism which ensures the lateral displacement of the shutter plates 20 and 22 corresponding to the arrows 32 and 34. This is now illustrated schematically with reference to FIG. 3: two rod assemblies, which as a whole are denoted by 36 and 36', act on the plate arrangement. The rod assemblies 36 and 36' each comprise an outer limb 38, 38' and an inner limb 40 and 40', respectively. The limbs 38/38' and 40/40' are connected to one another via an articulated joint 42 and 42', respectively. The articulated joint 42 or 42' makes possible a relative movement of the outer limbs 38 and 38' with respect to the inner limbs 40 and 40'. It is provided here that the outer limbs 38 and 38' are each connected to one of the shutter plates, namely the outer limb 38 to the first shutter plate 20 and the outer limb 38' to the second shutter plate 22. In contrast, the inner limbs 40 and 40' are in this case conceived as supporting elements and are supported on the mask plate 18 or on component parts which are fixedly connected to the mask plates 18.

If the articulated joints 42, 42' are now pressed in the insertion direction corresponding to the arrow 30, the V-shaped rod assembly 36 is spread apart, which means that the respective outer limbs 38 and 38' move outward corresponding to the arrows 32 and 34 and displace the shutter plates 20 and 22.

Figure 4:
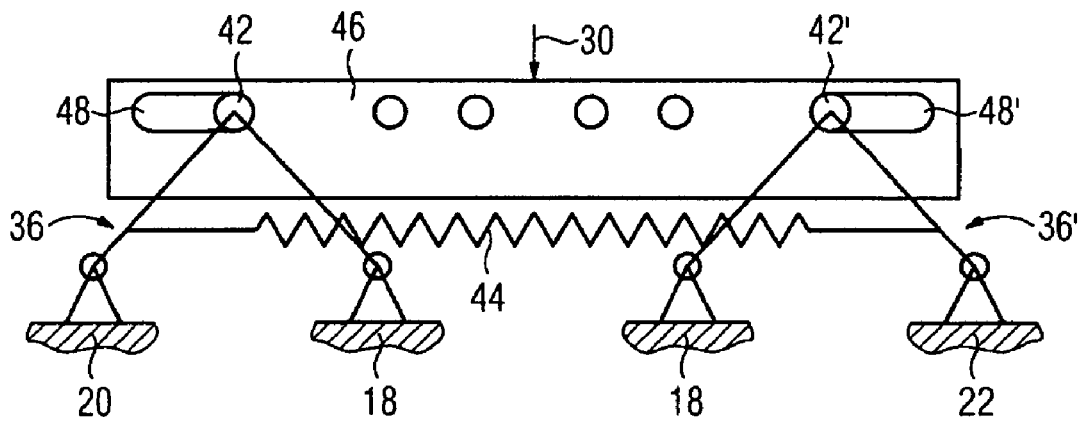
FIG. 4 shows, using a basic diagram similar to that in FIG. 3, the way in which an actuating element according to an embodiment of the invention functions.

As shown in FIG. 4, the articulated joints 42 and 42' are now not pressed directly by an inserted circuit breaker. Instead, an actuating element 46 is provided which receives forces from the inserted circuit breaker and transfers them to the articulated joints 42 and 42'. The actuating element 46 comprises two slots 48 and 48', respectively, and in each case pins are formed on the articulated joints 42 and 42', which pins engage in the slots 48 and 48', respectively. If an inserted circuit breaker now presses on the actuating element 46, corresponding to the arrow 30, it transmits force via the pins to the articulated joints; 42 and 42', and the rod assemblies 36, 36' are spread apart, counter to the force of a spring 44, via which the outer limbs 38 and 38' are coupled to one another. The relative movement of the articulated joints 42, 42' with respect to one another, namely initially apart from one another, is made possible by virtue of the fact that the pins can move along in the slots 48 and 48', respectively. The movement ends at the latest when the pins have reached the end of the slots 48 and 48'. The open position of the closing apparatus has then been reached.

Figure 3:
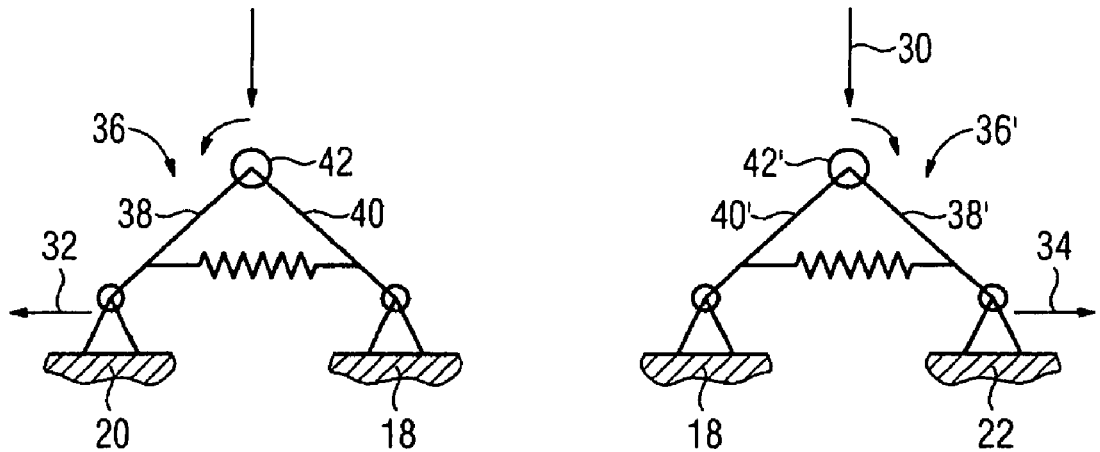
FIG. 3 shows a basic diagram of the mechanism used in the closing apparatus according to an embodiment of the invention for illustrating the transition between a closed state and an open state.
Figure 5:
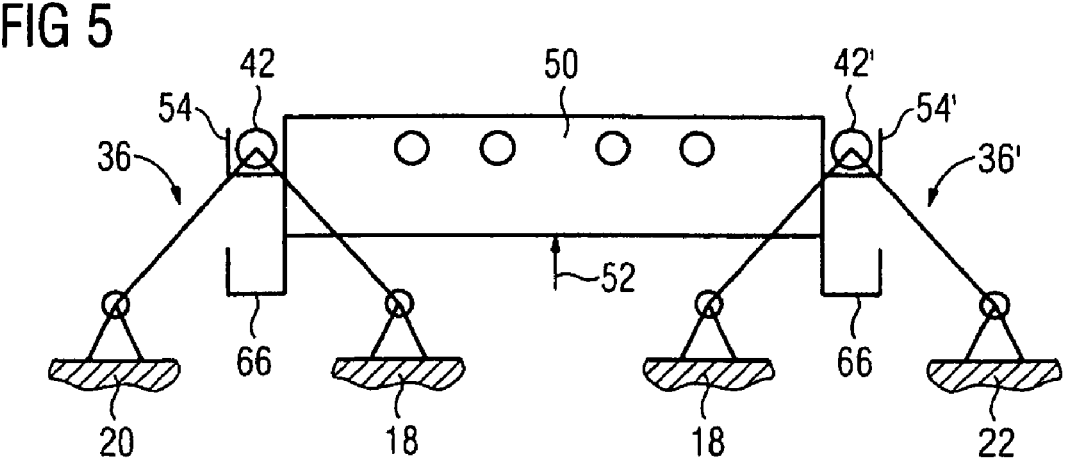
FIG. 5 shows, using a basic diagram similar to that in FIG. 3, the way in which a locking apparatus according to an embodiment of the invention functions.

FIG. 5 now shows the basic diagram shown in FIG. 3 in conjunction with a locking element 50. In the embodiment to be illustrated here, the locking element 50 is located in the interior of the actuating element 46. For reasons of simplicity of the illustration, FIG. 5 merely shows the locking element 50. This locking element can be brought into the position shown in FIG. 5 in the direction of the arrow 52 relative to the actuating element 46. Hooks 54 and 54', respectively, of the locking element engage around the pins on the articulated joints 42 and 42', respectively, and therefore prevent any movement of the pins, and thus any movement of the articulated joints and thus prevent the rod assemblies 36 and 36' from being spread apart. The locking element 40 is brought into the position shown in FIG. 5 in particular when the withdrawable-part rack 10 is already open and it is not provided that a circuit breaker is inserted. In order then to prevent a user from actuating the actuating element 46 manually and from producing the open state, in the closed state the locking element is brought into the locking position shown in FIG. 5 corresponding to the arrow 52, with the result that the user needs to act at least on the locking element 50 before he can actuate the actuating element 46 corresponding to the arrow 30.

Figure 6:
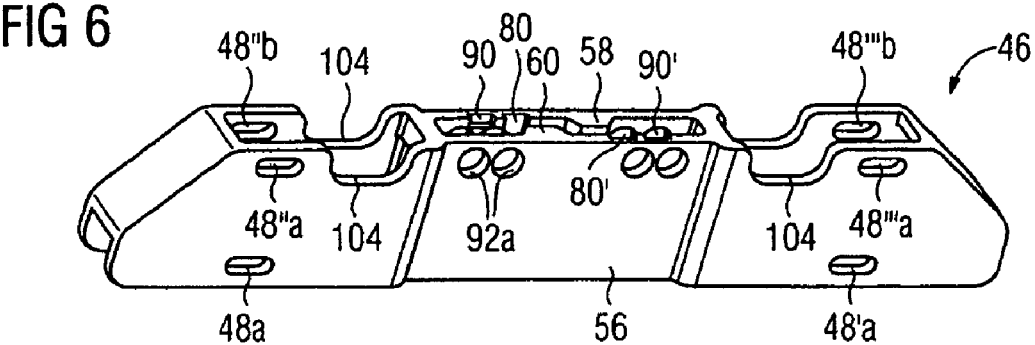
FIG. 6 shows a perspective view of an actuating element according to an embodiment of the invention.
Figure 7:
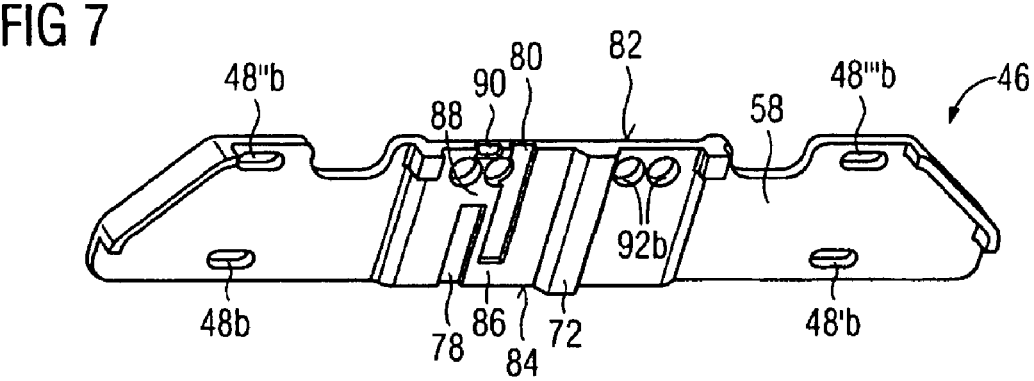
FIG. 7 shows a perspective view of an actuating element according to an embodiment of the invention from FIG. 6, in which the front panel is removed.
Figure 8:
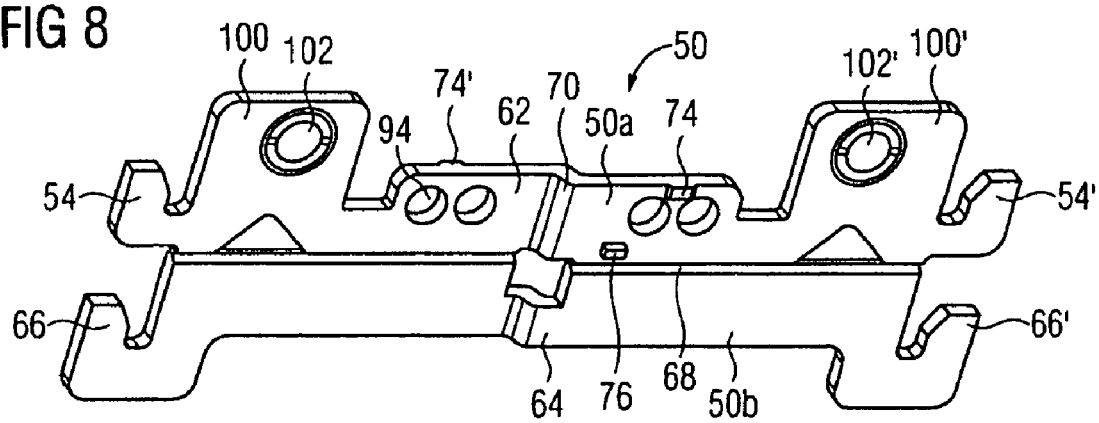
FIG. 8 shows a perspective view of a locking element according to an embodiment of the invention as is used for a closing apparatus of the larger type.
Figure 9:
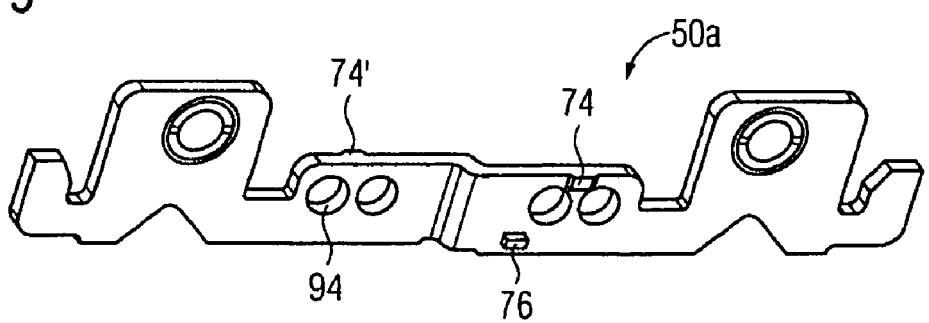
FIG. 9 shows a view according to an embodiment of the invention of a locking element according to an embodiment of the invention illustrating how it is used in a closing apparatus of the smaller type.

The actuating element 46 individually has the appearance shown in FIGS. 6 and 7, and the locking element 50 has the appearance shown in FIG. 8, it being possible for the latter to be transferred to the state shown in FIG. 9.

The actuating element 46 comprises two separate parts, namely an upper part 56 and a lower part 58, which are substantially plate-shaped. The two parts comprise bores 57a and 57b for screws, with which they are fastened to one another. Each part is constructed as shown in FIG. 7. A hook 59 of one part engages in a catch 61 of the other part. The actuating element 46 is designed for two types of closing apparatuses. When using the smaller type of closing apparatus, pins engage in the slots 48"a and 48'''a in the plate 56 at the same time in corresponding slots 48b and 48'b in the plate 58 corresponding to the illustration shown in FIG. 4.

An interspace 60 is provided between the plates 56 and 58, in which interspace the locking element 50 from FIG. 8 can move. The locking element 50 is formed in two parts and comprises a first part 50a with a plate-shaped central part 62, on which the hooks 54 and 54' are formed laterally, and the second part 50b of the locking element likewise comprises a plate-shaped central part 64, on whose lateral ends hooks 66 and 66' are formed. The hooks 66 and 66' are intended for the case in which the larger type of closing apparatus is used. The second part 50b of the lock of the locking element 50 is connected to the first part 50a via a predetermined breaking point 68. By breaking the parts apart from one another, the part 50a alone can be retained, and this is used if the smaller type of closing apparatus is used.

The locking element 50 is now intended to be capable of moving to and fro in the interspace 60 of the actuating element 46, corresponding to the arrow 52 (cf. FIG. 5). In order to guide the locking element 50 in the interspace, there is firstly a kink 70 in the plate-shaped central parts 62 and 64 of the locking element 50, which can be moved along a rail 72 in the interspace 60, which is formed on the plate 58.

Bevels (not denoted in the figures), such as also the pins, prevent the locking element 50 from being capable of being displaced to any desired extent in the direction counter to the insertion direction of a circuit breaker, i.e. in the direction shown by arrow 52. The locking element 50 could, however, in principle fall out at the open side of the actuating element 46 which is at the bottom in FIGS. 6 and 7. This is prevented by latching: two latching tabs 74 and 76 are formed on the part 50a of the locking element 50, and these latching tabs correspond to grooves 78 and 80 in the plate 58 of the actuating element 46.

If it is intended for the locking element 50 to be inserted into the interspace 60 from the open end (at the bottom in FIGS. 6 and 7) of the actuating element 46, the latching tab 76 cannot immediately engage in the groove 80. This is prevented by virtue of the fact that the groove 80 does not extend continuously from the upper edge 82 to the lower edge 84 of the plate 58. When the locking element is inserted into the interspace 60, the latching tab 56 needs to overcome a region 86 in which the groove is not formed. In this case, the locking element 50 needs to spring back. The groove 78 is also not formed continuously from the upper edge 82 to the lower edge 84. It has an intermediate region 88, in which it is interrupted.

If it is intended for the locking element 50 to be displaced corresponding to the arrow 52 (FIG. 5) in the interspace 60, the latching tab 74 first slides along in the groove 78 until it reaches the region 88. Then the plate-shaped central part 62 needs to spring back in order that the locking element 50 can be displaced further. In the end position, the latching tab 74 snaps into a depression 90, which to a certain extent is a continuation of the groove 78. The latching tabs 74 and 76 therefore mean that it is firstly possible for the locking element 50 to be removed from the actuating element 46 only by a latching resistance being overcome and secondly for it to be brought back out of the locking state only by a latching resistance being overcome. Latching tabs 74' arranged in mirror-symmetrical fashion (with the bend point 70 as the center of mirror symmetry) and a further latching tab (not shown in FIGS. 8 and 9), which corresponds to the latching tab 76, correspond to the latching tabs 74 and 76, and, correspondingly, appropriate formations are provided in mirror symmetry with respect to the grooves 78 and 80 and with respect to the cutout 90 in the plate 56.

The two plates 56 and 58 have a plurality of holes 92a and 92b, respectively, and corresponding holes 94 are provided in the first part 50a of the locking element 50. If the locking element 50 is displaced into the locking position, the holes 92a and 94 and therefore also 94 and 92b align with one another and a hoop 96 of a padlock 98 (shown in FIG. 10) can be passed through. The closing apparatus can therefore be locked in order that an operator is prevented from producing the open position of the closing apparatus.

No mention has yet been made of tongues 100 and 100', which protrude from the plate-shaped central part 62 of the upper part 50a of the locking element 50 and in which hollow grips 102 and 102', are formed. The tongues 100 and 100' protrude out slightly and the hollow grips 102 and 102' are accessible in particular by virtue of the fact that cutouts 104 are provided in the plates 56 and 58. An operator can grip a hollow grip 102 with one finger and another hollow grip 102' with another finger and withdraw the locking element 50 in order to lock the apparatus. By virtue of the fact that the tongues 100 and 100' protrude, automatic unlocking through the rear wall of a circuit breaker can take place when the latter is inserted into the withdrawable-part rack.

Figure 10:
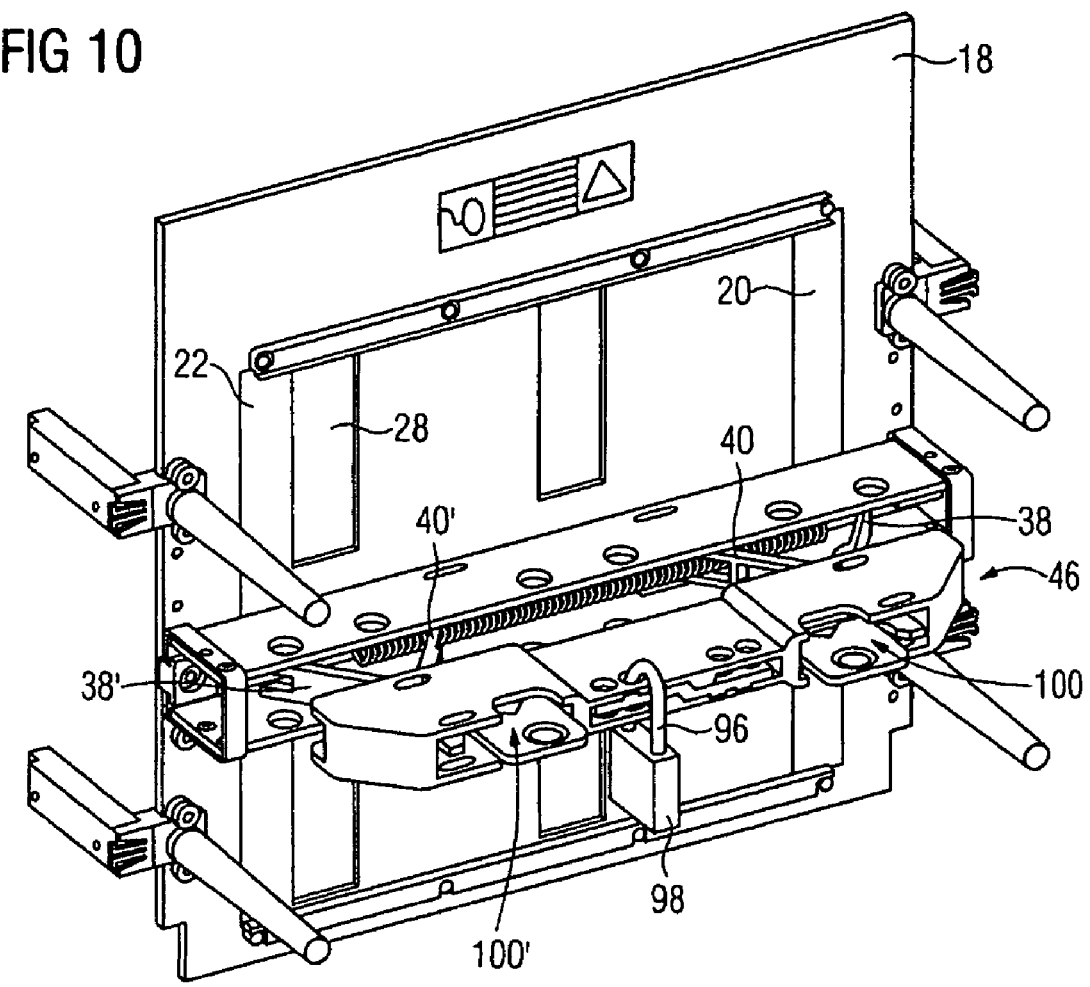
FIG. 10 shows a perspective view of a closing apparatus according to an embodiment of the invention in the locked state, which is secured by a padlock.
Figure 11:
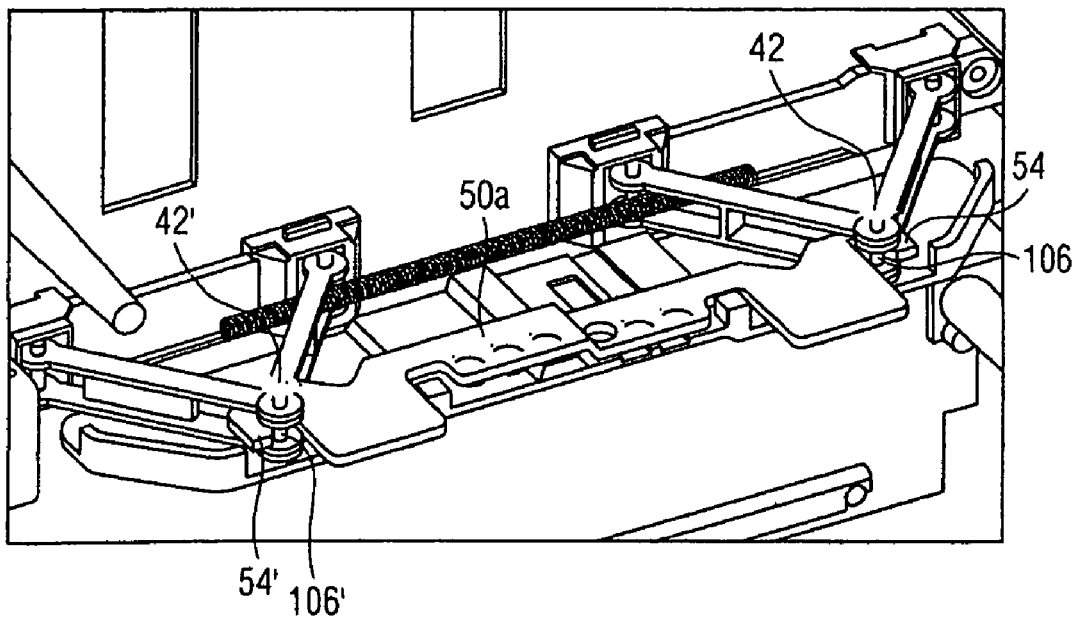
FIG. 11 shows an internal view of the closing apparatus from FIG. 10.
Figure 12:
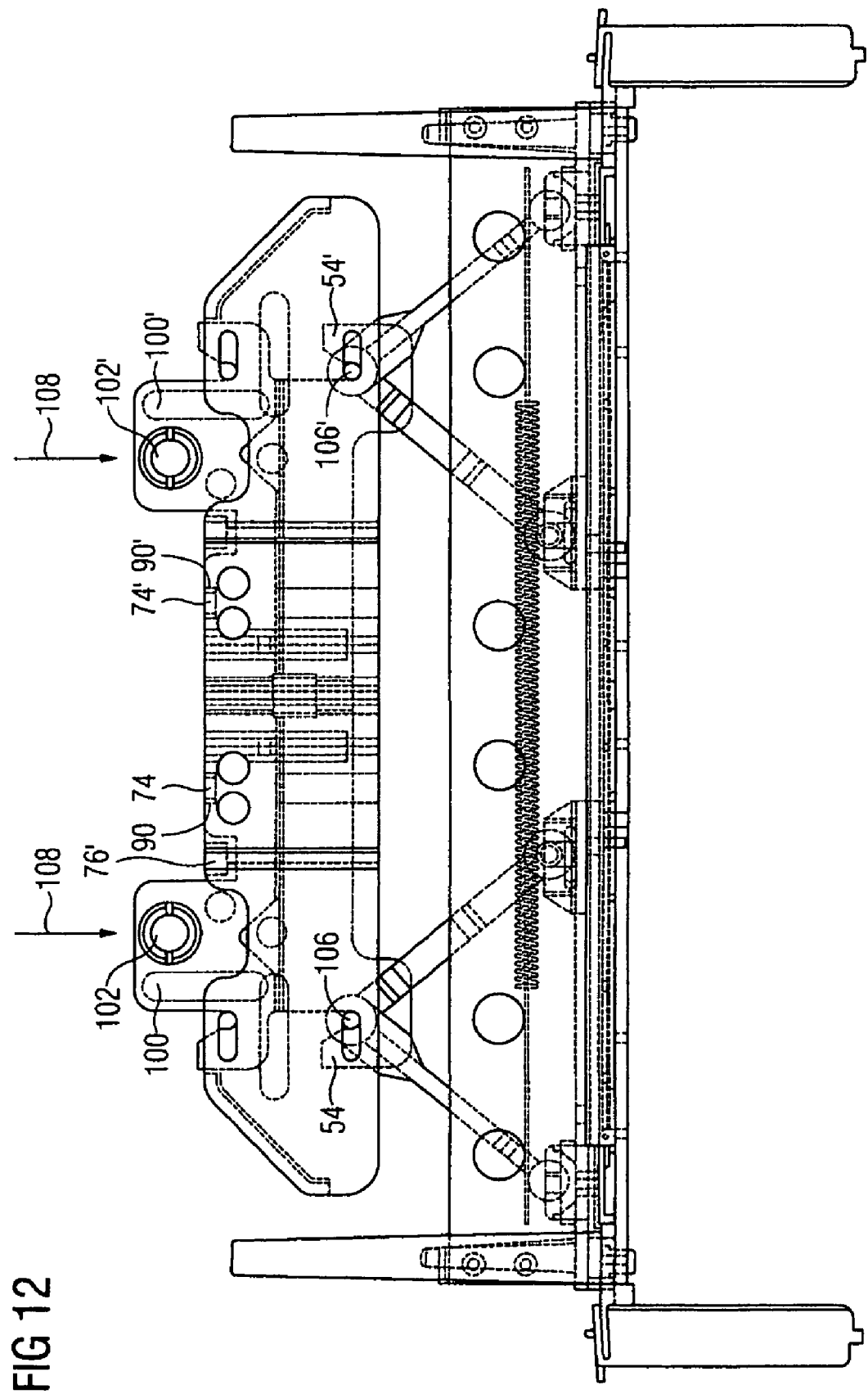
FIG. 12 shows a view of the closing apparatus from FIG. 10 from above with lines identifying the interior of the component parts.

The locked state has already been explained above with reference to FIG. 5; it is illustrated in detail in FIGS. 10 to 12. It can be seen particularly clearly in FIG. 11 how the hooks 54 and 54' engage around the pins 106 and 106', respectively, formed on the articulated joints 42 and 42', respectively. FIG. 12 shows the same but with a slightly different representation. In this representation, it can also be seen how the latching tabs 74 and 74' are latched into the cutouts 90 and 90', respectively. In order to unlock the actuating element or the entire closing apparatus, an operator needs to exert a force corresponding to the arrow 108 manually by acting on the tongues 100 and 100', respectively. The latching resistance is then overcome by the latching tabs 74 and 74', they brush over the region 88 (or a corresponding region which is not illustrated in the figures) and are guided further in the groove 78 (or a corresponding groove). Then, a circuit breaker can be inserted in order that the force is exerted on the actuating element and the open position is reached, as has been explained above with reference to FIG. 2.

LIST OF REFERENCE SYMBOLS

10 Withdrawable-part rack
12 Contact blade
14 Plate arrangement
16, 44 Springs
18 Mask plate
20, 22 Shutter plates
24, 26, 28 Openings
30, 32, 34, 52, 108 Arrows
36, 36' Rod assemblies
38, 38' Outer limbs
40, 40' Inner limbs
42, 42' Articulated joints
46 Actuating element.
48, 48'a, 48"a, 48'"a; Slots
48b, 48'b, 48"b, 48'"b
50, 50a, 50b Locking element
54, 54'; 66, 66' Hooks
56, 58 Plate
57a, 57b Bores
59 Hooks
60 Interspace
61 Catch
62, 64 Plate-shaped central part
68 Predetermined breaking point
72 Rail
74, 74'; 76 Latching tabs
78, 80; 80', 90' Grooves
82, 84 Edges
88 Intermediate region
90 Depression
92a, 92b, 94 Holes
96 Hoop
98 Padlock
100, 100' Tongues
102, 102' Hollow grip
104 Cutout
106, 106' Pins Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A closing apparatus for a withdrawable-part rack, into which a circuit breaker is insertable, the closing apparatus comprising:
    at least two plates with openings, in a closed state of the closing apparatus the openings of each plate each being covered by one other plate and in an open state of the closing apparatus the openings of all of the plates lying over one another, for the purpose of changing between the closed state and the open state, at least one plate being capable of being displaced by a mechanism which is activatable by an inserted circuit breaker and which comprises two V-shaped rod assemblies, of which two limbs are connected via an articulated joint, which makes it possible for the rod assembly to spread apart, a free end of one of the limbs being connected to a plate to be displaced, each of the two V-shaped rod assemblies including at least one pin, each pin engaging in an associated guide in an actuating element.

2. The closing apparatus as claimed in claim 1, wherein the actuating element is in the form of a rigid body.

3. The closing apparatus as claimed in claim 1, wherein the guides are formed by slots in at least one plate of the actuating element.

4. The closing apparatus as claimed in claim 1, wherein each pin bears against at least one of
    a first stop at a first end of its associated guide in the closed state of the closing apparatus and
    a second stop at a second end of its associated guide in the open state of the closing apparatus.

5. The closing apparatus as claimed in claim 1, wherein the two v-shaped rod assemblies are coupled to one another outside of the actuating element via a spring.

6. The closing apparatus as claimed in claim 1, wherein the at least one pin is associated with the articulated joint of one of the two V-shaped rod assemblies.

7. The closing apparatus as claimed in claim 1, wherein a locking element is at least one of arranged in and on the actuating element, is the locking element being capable of moving relative to the actuating element in order to assume a locking state in which it suppresses a movement of the pins in the respective guide.

8. The closing apparatus as claimed in claim 1, wherein the locking element comprises at least one hook engaging around a pin in the locking state.

9. The closing apparatus as claimed in claim 1, wherein, in the locking state at least one hole in the locking element comes into congruence with at least one hole in the actuating element, with the result that it is possible for a hoop of a padlock to be passed through.

10. The closing apparatus as claimed in claim 1, wherein the locking element, as a result of a latching operation, is held in at least one of the actuating element and the locking state.

11. The closing apparatus as claimed in claim 1, wherein, during the latching operation, latching tabs on the locking element engage in grooves of the actuating element, in which they are guided during the movement of the locking element.

12. The locking apparatus as claimed in claim 1, wherein at least one grip element of the locking element is always accessible in order to be able to bring the locking element into the locking state manually.

13. A withdrawable-part rack comprising a closing apparatus as claimed in claim 1.

14. The closing apparatus as claimed in claim 2, wherein the actuating element is in two parts.

15. The closing apparatus as claimed in claim 2, wherein the guides are formed by slots in at least one plate of the actuating element.

16. A withdrawable-part rack comprising a closing apparatus as claimed in claim 2.

* * * * *